(12) United States Patent
Antal

(10) Patent No.: US 9,255,401 B2
(45) Date of Patent: Feb. 9, 2016

(54) LIGHTWEIGHT BUILDING STRUCTURE PRODUCED BY USING A MORTAR

(71) Applicant: István Antal, Szeged (HU)

(72) Inventor: István Antal, Szeged (HU)

(*) Notice: Subject to any disclaimer, the term of this patent is extended or adjusted under 35 U.S.C. 154(b) by 0 days.

(21) Appl. No.: 13/932,606

(22) Filed: Jul. 1, 2013

(65) Prior Publication Data
US 2013/0291470 A1 Nov. 7, 2013

Related U.S. Application Data

(63) Continuation of application No. 13/128,789, filed as application No. PCT/HU2009/000093 on Nov. 10, 2009, now Pat. No. 8,539,721.

(30) Foreign Application Priority Data

Nov. 19, 2008 (HU) .................................. 0800701

(51) Int. Cl.
*E04B 2/86* (2006.01)
*E04B 1/16* (2006.01)
(Continued)

(52) U.S. Cl.
CPC ............... *E04B 5/32* (2013.01); *C04B 18/021* (2013.01); *C04B 18/027* (2013.01); *C04B 18/16* (2013.01); *C04B 28/02* (2013.01); *C04B 40/0608* (2013.01); *E04B 1/161* (2013.01); *E04B 5/29* (2013.01); *E04B 7/02* (2013.01);
(Continued)

(58) Field of Classification Search
CPC ......... C04B 28/02; C04B 16/08; E04C 2/044; E04C 2/049; E04C 2/384; B32B 13/04; E04B 1/14

USPC .................. 52/91.1, 91.3, 424, 425, 426, 430
See application file for complete search history.

(56) References Cited

U.S. PATENT DOCUMENTS 1,810,891 A * 6/1931 Bemis .............................. 52/426
3,604,174 A * 9/1971 Nelson, Jr. ...................... 52/601
(Continued)

FOREIGN PATENT DOCUMENTS

| AT | 392 962 b | 7/1991 |
|----|-----------|--------|
| DE | 19941254  | 3/2001 |

(Continued)

OTHER PUBLICATIONS

International Search report corresponding to PCT/HU2009/000093 dated May 27, 2010.
(Continued)

*Primary Examiner* — Joshua J Michener
*Assistant Examiner* — Kyle Walraed-Sullivan
(74) *Attorney, Agent, or Firm* — Hershkovitz & Associates, PLLC; Abe Hershkovitz

(57) ABSTRACT

The invention concerns the field of a lightweight building structure produced by using a mortar containing foamed polystyrene and cement. It includes at least one layer of prefabricated foam concrete panel affixed to a reinforcing frame structure wherein interspaces between elements of the reinforcing frame structure are at least partially filled with a mortar providing a first surface contacting the foam concrete panel. The mortar includes granules of 0.5-10 mm size produced by grinding a pressed foamed concrete that has been allowed to mature, 50-200 kg of unbound, anhydrous cement, and 150-300 liters of water added before application per one cubic meter of ground material, respectively.

23 Claims, 1 Drawing Sheet

(51) Int. Cl.
| | | |
|---|---|---|
| *E04B 5/32* | (2006.01) | |
| *C04B 18/02* | (2006.01) | |
| *C04B 18/16* | (2006.01) | |
| *C04B 28/02* | (2006.01) | |
| *C04B 40/06* | (2006.01) | |
| *E04B 5/29* | (2006.01) | |
| *E04B 7/02* | (2006.01) | |
| *C04B 111/00* | (2006.01) | |
| *C04B 111/28* | (2006.01) | |
| *C04B 111/34* | (2006.01) | |
| *C04B 111/40* | (2006.01) | |
| *C04B 111/52* | (2006.01) | |
| *C04B 111/60* | (2006.01) | |

(52) U.S. Cl.
CPC .............. *C04B2111/00603* (2013.01); *C04B 2111/00698* (2013.01); *C04B 2111/28* (2013.01); *C04B 2111/346* (2013.01); *C04B 2111/40* (2013.01); *C04B 2111/52* (2013.01); *C04B 2111/60* (2013.01); *E04B 2/8635* (2013.01); *Y02W 30/95* (2015.05); *Y10T 428/249968* (2015.04)

(56) References Cited

U.S. PATENT DOCUMENTS

| | | | |
|---|---|---|---|
| 3,992,844 A * | 11/1976 | Gretter | 52/426 |
| 4,283,896 A * | 8/1981 | Fricker et al. | 52/410 |
| 5,570,552 A * | 11/1996 | Nehring | 52/426 |
| 5,758,463 A * | 6/1998 | Mancini, Jr. | 52/309.12 |
| 6,510,667 B1 * | 1/2003 | Cottier et al. | 52/742.14 |
| 2002/0139075 A1* | 10/2002 | Shubow et al. | 52/309.12 |
| 2006/0016143 A1* | 1/2006 | Morris | 52/425 |
| 2006/0201090 A1* | 9/2006 | Guevara et al. | 52/309.12 |
| 2007/0039269 A1* | 2/2007 | Niese et al. | 52/403.1 |
| 2007/0062143 A1* | 3/2007 | Noushad | 52/426 |
| 2012/0216478 A1* | 8/2012 | Mees | 52/426 |

FOREIGN PATENT DOCUMENTS

| | | |
|---|---|---|
| DE | 103 14 879 | 10/2004 |
| GB | 1498383 | 1/1978 |

OTHER PUBLICATIONS

Tang et al; "Mechanical and drying shrinkage properties of structural-graded polystyrene aggregate concrete", Jan. 18, 2008, pp. 403-409, vol. 30, No. 5, Cement and Concrete Composites, Elsevier Applied Science, Barking, GB (Abstract).

* cited by examiner

LIGHTWEIGHT BUILDING STRUCTURE PRODUCED BY USING A MORTAR

CROSS-REFERENCE TO RELATED APPLICATIONS

This application is a continuation of U.S. patent application Ser. No. 13/128,789 filed on May 11, 2011, which is a national stage application derived from International Application No. PCT/HU2009/000093 which was filed on Nov. 10, 2009 and which claims priority from Hungarian Application No. P0800701 filed on Nov. 19, 2008.

THE FIELD OF THE INVENTION

The invention concerns the field of the construction industry and relates to a building mortar containing polystyrene and cement, as well as building structures produced by the use of such a mortar.

BACKGROUND OF THE INVENTION

For the production of building structures having good thermal and sound control properties, mortars containing foamed polystyrene, cement and water are used, which are formed into building units either at the site of the construction or in a factory producing building materials. Such mortar is explained in the specification of GB 1 498 383.

Building units are produced from mortar containing polystyrene foam in such a manner that the mortar is poured into a mould, pressed, and if necessary, heat treated for instance under pressure. Then when the appropriate solidity is achieved, it is taken out of the mould and is allowed to stand in order to minimise the contraction tendency of such concrete containing polystyrene foam, hereinafter referred to as foam concrete. After a prescribed standing time, the building units so produced are formed into the desired size and form.

Such processing cannot be carried out at the site of construction because there the mortar cannot be pressed, heat treated and allowed to stand. If such mortar is poured into e.g. the permanent formwork during construction, problems may arise due to contraction.

SUMMARY OF THE INVENTION

The objective is to create such a building mortar which can be applied on site, the contraction of which is small and has good sound and thermal insulation properties. Another objective is to create such a mortar from which building structures and structure elements suitable to bear weight can be created.

A further objective is to create lightweight building structures with good thermal and sound insulation properties by using such mortar.

In order to achieve the set objectives, a mortar has been created to contain ground material made by grinding foam concrete that has already contracted and been allowed to mature and contains cement added thereto; water is added to this mixture upon application. Of course, the ground material, the cement and the water may be mixed also at the same time upon application.

The mortar so produced this way sets quickly, and has a very good thermal conductivity coefficient, which is 30-40% higher than a good-quality prefabricated foam concrete building unit.

In the course of the method for producing the mortar according to the invention, already set and contracted foam concrete is ground into granules no larger than 10 mm in size, and the 50-150 kg of cement and 80-200 litre of water are added to this mixture. For the sake of the processability of the mortar, the cement-water ratio may differ from the ratio usually applied in concrete mortars, e.g. it is generally higher than in the latter.

The mortar according to the invention can be produced at the site of construction because the necessary grinder can be transported easily and makes the reuse of waste generated at the construction site possible. If the amount of waste generated on site is not enough, such ground material or waste suitable for grinding can be obtained from a factory producing foam concrete products. The ground material and the required cement and water can be poured into a mortar making device, then into a mortar pump, which forwards the wet mortar to the place of application subsequent to mixing.

If using a quantity of cement higher than the prescribed amount, the mortar produced may still be used but simultaneously with the increased solidity achievable by this mixture, otherwise, its thermal and sound insulation properties deteriorate and a tendency for contraction may arise as well.

The mortar produced with the prescribed quantities and properly applied is not solid but it is step resistant, therefore its surfaces exposed to load and abrasion must be protected by an appropriate layer.

By using the mortar according to the invention, a building structure has been provided, and includes at least one layer of prefabricated foam concrete panel attached to a reinforcing frame structure. The space between elements of the reinforcing frame structure is filled at least partially with the mortar according to the invention, the first surface of which contacts the foam concrete panel.

The building structure according to the invention may be also formed as a floor/ceiling structure where the reinforcing frame structure contains a load bearing beam placed in the plane of the floor/ceiling, a foam concrete panel fixed to the beam from below and mortar according to the invention applied in between and above the load bearing beams. The floor/ceiling structure may be horizontal, in which case it includes horizontally arranged load bearing beams of I, C or U profiles, and preferably there is a load-distributing grate placed above the load bearing beams in the mortar.

The building structure according to the invention may include a protecting layer spread over the mortar and if necessary, flooring placed thereon.

In the version of the building structure according to the invention where it is formed as a floor/ceiling structure, the panel of the floor/ceiling structure is angled below 75° from the horizontal.

In the version of the building structure according to the invention where it is formed as a standing wall element, it includes a first and a second layer of foam concrete panel fixed oppositely to the reinforcing frame structure, which layers constitute a fillable permanent formwork with one another and with the frame structure. The interspace between the foam concrete panels and the frame structure is filled with the mortar according to the invention. In the version of the building structure according to the invention where it is formed as a standing wall element, a surface finish or hard crust is formed on the free surface of the foam concrete panels opposite the one facing the mortar. One of the surfaces of the building structure is preferably constituted of a board made of foam concrete attached to a frame structure. The interspaces of the frame structure are filled with the mortar according to the invention.

So in the version of the building structure according to the invention where it is formed as a standing wall, a foam concrete board panel is attached to both sides of the frame structure and these panels constitute a permanent formwork for the mortar filled into the interspaces of the frame structure.

If the building structure according to the invention is a floor/ceiling structure, then the foam concrete panel constituting the permanent framework is fixed to its frame structure from below. In case of a load bearing floor/ceiling structure, preferably there is a load-distributing grate fixed to the frame structure and in order to achieve appropriate sound insulation, this load-distributing grate is covered with a layer of the mortar according to the invention of at least 3 cm but preferably of 5 cm. After 24 hours, typically a protecting layer, e.g. a screed layer may be applied to this layer, which protecting layer may be then covered with an appropriate covering.

If the building structure according to the invention is formed as a roof structure in a place where it is exposed to neither loading nor abrasion, then no load-distributing grate and no protecting layer are necessary.

If the building structure according to the invention is formed to hold up a roof covering, the elements for fixing the outer shell of the roof, e.g. laths, wood-blocks, may be embedded in the mortar.

The building structure according to the invention can be created very quickly; it is very light and has excellent thermal and sound insulation properties. Its further advantage is that the frame structure does not stand freely; in case of fire, the foam concrete panels protect the frame structure from quick warming. Of course, this advantage requires the use of foam concrete that is incombustible in itself.

Another advantage is that, after filling in, the mortar protects the elements of the frame structure from deformation caused by loading; the elements of the frame structure, with special regard to its ranges under pressure, are practically not exposed to distortion.

BRIEF DESCRIPTION OF THE DRAWINGS

The invention will be explained below with reference to exemplary embodiments shown in the drawings wherein.

DETAILED DESCRIPTION OF THE PREFERRED EMBODIMENTS

Figure 1:
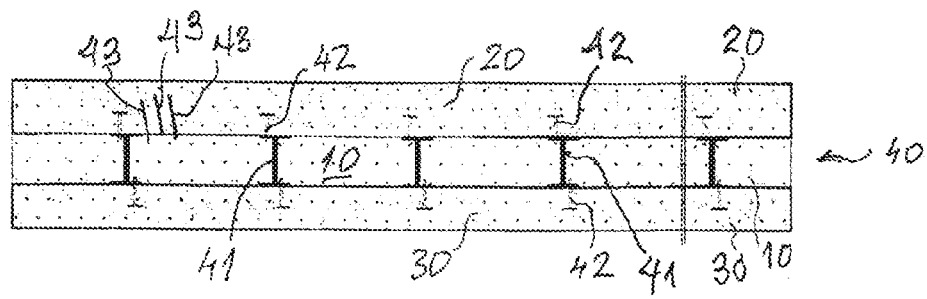
FIG. 1 is a horizontal plane section of the exterior load bearing wall structure created with the use of the mortar according to the invention.

FIG. 1 shows a horizontal plane section of an exterior load bearing wall, which borders a building on the outside, created with the use of mortar made according to the invention. This load bearing wall is created so that a frame structure 40 is built at first either of timber or metal profiles with appropriate corrosion protection. In this case, FIG. 1 shows vertical posts 41 of the frame structure 40, on which posts 41 12-cm-thick foam concrete panels 30 are affixed from the inside and 15-cm-thick foam concrete panels 20 are affixed from the outside. Fixing elements 42 may be plastic screws or snap-in fixing elements with a pressing surface large enough to hold the foam concrete panels 20, 30 without damage. Discs, small-holed washers or similar elements may be used to distribute pressure as necessary. In order to avoid thermal bridges and acoustic transmission paths, especially in case of fixing elements 42 made of metal, the fixing elements 42 are placed into indentations formed in the surface of foam concrete panels 20, 30. After mounting, mortar 10 is poured into interspaces between the posts 41 by a concrete pump, plastering machine, or other similar equipment suitable for this purpose, or by manual force. Density of the mortar 10 is relatively low; therefore the foam concrete panels 20, 30 bear the pressure of the filled-in mortar 10 easily and constitute a permanent formwork. Any excess amount of water in the mortar 10 can leak out through slits 43 in the foam concrete panels 20, 30. The hardening time of the mortar 10 is approximately 2 days.

Considering that the surface of the foam concrete panels 20, 30 is not sufficiently abrasion-proof and solid, at least the exterior foam concrete panel 20 must be provided with a hard crust formed in a manner similar to the case of an exterior thermal insulation covering made with polystyrene boards. The interior foam concrete panel 30 requires a less strong surface finish, e.g. glass-fibre wallpaper applied after gypsum plastering, which then may be further worked on as desired.

It should be noted that, after hardening, the mortar 10 distributes the load to the two foam concrete panels 20, 30, and this load distribution is what makes a load bearing wall structure possible. Without the application of the invention, the foam concrete panels 20, 30 are not even suitable for bearing wind pressure. However, the mortar 10 makes the formed wall structures solid to such an extent that they may also be used to create exterior load bearing walls of multi-storeyed buildings.

Figure 2:
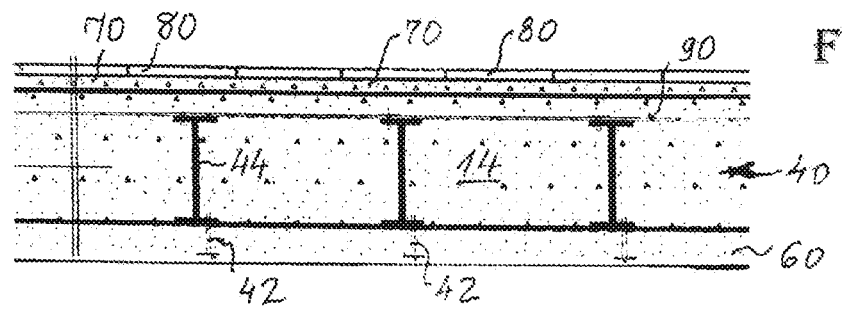
FIG. 2 is a section of the load bearing floor/ceiling structure transversal to the beams placed therein.

FIG. 2 shows a cross section of a load bearing floor/ceiling structure. In this case, the frame structure 40 is made of I-section beams 44, and foam concrete panels 60 are fixed to such beams 44 from below by fixing elements 42. A load-distributing grate 90 is affixed to a top of the beam 44, which load-distributing grate 90 may be e.g. a 5×5 cm mesh concrete-reinforcing steel mat made of 5-mm-diameter steel wire. After such fixing is carried out, the interspace between the beams 44 constituting the frame structure 40 is filled with mortar 14. In order to realise the sound proofing quality of the mortar according to the invention, the formation of acoustic transmission paths in the floor/ceiling structure from top to bottom must be avoided. To this end, the mortar 14 is poured in to a level higher than that of the load-distributing grate 90 and thus the mortar 14 will cover the load-distributing grate 90, preferably in a 3-5 cm thick layer. On top of this layer, two 3-cm-thick high-strength, composition floor screed layers 70, 80 are applied and may be covered as desired.

One cubic meter of dry ground foam concrete, with a granule size that may be approximately between 1 mm and 10 mm, is mixed with 200 litres of water and 100 kg of cement (type: A-P 32,5R 350 trass, i.e. a light-colored volcanic tuff used in Portland cement 20, though it will bind with any other cement of less good quality) is added. This mixture will result in a consistency similar to earth-damp concrete. Then the mixture is poured into the floor/ceiling structure by hand or a machine, according to the order of layers indicated in FIG. 2. Thereby, the polystyrene foam concrete creates a complete filling between the adjacent I-section beams 44 so they cannot be wrenched out because the mixture is held by the bolted-on foam concrete panel 60 from below, the filled-in mortar 14 in between, and the 0.5 mm thick load-distributing grate 90 from above. After the mortar 14 is poured to a level 4-5 cm higher than the load-distributing grate 90 and the beam 44, it is compacted by a vibrating poker and a straight plane surface is created. After the time required for hardening expires, a 4-5 cm thick concrete or screed layer is poured thereon as a protective layer. Then it is covered with ceramics, wood or other finishing material.

The weight of the floor/ceiling structure created in this way can be calculated as follows:

The weight of 1 m³ foam concrete is between 200 and 230 kg, the weight of the added cement is 100 kg.

Screed: 60 kg/m²-3 cm thick.

Steel: 10 kg/m².

For the weight of the water, only the amount bound by the cement should be taken into account.

Thus, the weight of a 38 cm thick floor/ceiling structure is approximately 225 kg/m².

It should be noted that, compared to a traditional concrete floor/ceiling structure, weight by surface can be reduced by one-fifth by applying the invention. Moreover, it dries and can be covered within 48 hours. On the other hand, the full drying (hardening) time of traditional concrete floor/ceiling structures is 28 days and can be covered only thereafter.

Figure 3:
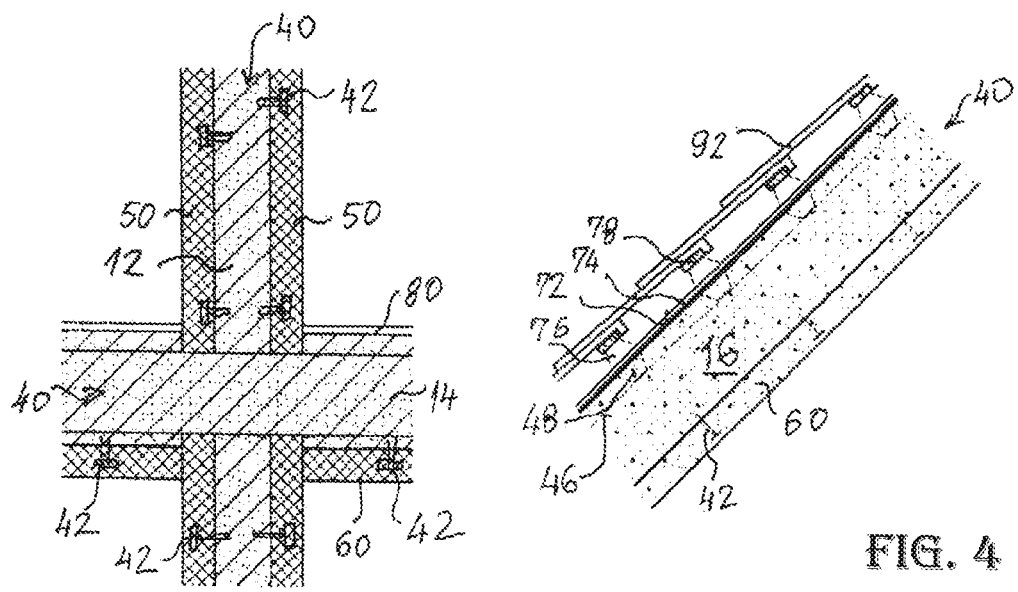
FIG. 3 is a schematic section view of the joint of the interior load bearing wall and the floor/ceiling.
Figure 4:
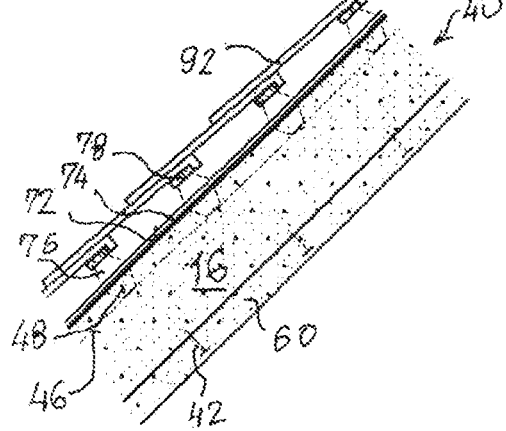
FIG. 4 is a section of the roof shell including an inclined floor/ceiling structure created with the application of the mortar according to the invention.

FIG. 3 shows that interior load bearing walls can also be built on the floor/ceiling structure created by using the mortar according to the invention. The frame structure 40 of the horizontal floor/ceiling and the frame structure 40 of the vertical load bearing wall are mounted perpendicular to one another. The foam concrete panels 60 constituting the lower permanent formwork of the horizontal floor/ceiling structure and foam concrete panels 50 of the vertical load bearing wall are fixed to the frame structure 40 by the fixing elements 42. The horizontal floor/ceiling structure is created after the lower vertical load bearing walls are completed. Then the foam concrete panels 50 of the vertical load bearing walls of the next level are mounted. Thereafter, the horizontal floor/ceiling structure is filled with the mortar 14 according to the invention, 24-48 hours later a high-strength screed layer 80 is applied, and then the interspace between the foam concrete panels 50 located above is filled with mortar 12 according to the invention. FIG. 4 shows a 45° degree roof shell structure created by using the mortar according to the invention. In this case the frame structure 40 is made of sloping beams or I-beams 46 substituting for the sloping beams, which are indicated by only a dotted line at the top of the figure and may be made of galvanized steel. At first, the frame structure 40 is assembled, then the foam concrete panels 60 are attached to its lower side by the fixing elements 42. Spacing pieces 48 are fixed to tops of the I-beams 46, and such spacing pieces 48 may be wood blocks. Then the interspace of the frame structure 40 is filled with mortar 16 according to the invention and the mortar 16 is evened up at a top level of the spacing pieces 48. The consistency of the mortar according to the invention is such that it may be used up to an angle of 75-80°. In case of a steeper angle, there is a risk of slumping of the mortar during application.

After a hardening time of approximately 2 days, an underlay 72 is placed on the surface, which underlay 72 is a foil with controlled vapour permeability traditionally used for making roofs in the construction industry. The foil is fixed by furring strips 74 attached to the spacing pieces 48. Then secondary spacing pieces 76 may be mounted on tops of the strips 74 at the same time or in a separate working phase, and thereafter roof battens 78 holding roof tiles 92 are fixed thereon. By using the spacing pieces 76 and by the right selection of their proper size, the ventilation of the roof can be improved.

Although the invention is explained with reference to its preferable embodiments, it should be clear to the professional builder with average expertise in the construction field that various modifications and alternatives may be realised. The objective of the claims is intended to extend the invention to such modifications and alternatives.

I claim:

1. A building structure comprising:
    a reinforcing frame structure having interspaces;
    at least one layer of a prefabricated, hardened, foam concrete panel fixed to the reinforcing frame structure; and
    grinded and pressed foamed concrete that has been allowed to mature in order to produce granules of 0.5-10 mm size;
    said interspaces are at least partially filled with a mortar providing a first surface contacting the foam concrete panel and having the foamed concrete granules of 0.5-10 mm size, wherein 50-200 kg of unbound, anhydrous cement and 150-300 litters of water are added before application per 1 m³ of the grinded and pressed foamed concrete;
    a protecting layer spread over the mortar;
    said foam concrete panel includes slits to enable leakage of any excess amount of water in the mortar;
    wherein said foam concrete panel is fixed to the reinforcing frame structure by fixing elements placed into indentations formed in a surface of said foam concrete panel; and
    wherein hardening time of said mortar is approximately 48 hours.

2. The building structure according to claim 1, wherein the building structure comprises at least two foam concrete panels and is formed as a standing wall element including a first and second layer of said prefabricated, hardened, foam concrete panels fixed to opposite sides of the reinforcing frame structure, wherein said foam concrete panels together with said reinforcing frame structure constitute a permanent formwork defining said interspaces that may be filled with the mortar, and wherein the interspaces between the foam concrete panels and the reinforcing frame structure are filled with said mortar.

3. The building structure according to claim 1, wherein the building structure is formed as a floor/ceiling structure wherein the reinforcing frame structure includes load bearing beams placed in a plane of the floor/ceiling structure, the foam concrete panel fixed to the load bearing beams from below, and said mortar is applied between and over the load bearing beams.

4. The building structure according to claim 3, wherein said floor/ceiling structure is horizontal and includes horizontally arranged load bearing beams selected from I, C or U profiles.

5. The building structure according to claim 4, further comprising a load-distributing grate placed in the mortar above the load bearing beams; and the building structure includes at least two foam concrete panels.

6. The building structure according to claim 4, further comprising a protective layer spread over the mortar and flooring placed onto said protective layer.

7. The building structure according to claim 3, wherein the foam concrete panel of the floor/ceiling structure is angled less than 75° to a horizontal axis of the building and the building structure has at least two foam concrete panels.

8. The building structure according to claim 2, wherein a surface finish or hard crust is formed on a free surface of at least one of said foam concrete panels opposite a surface facing said mortar.

9. The building structure according to claim 2, wherein a surface finish or hard crust is formed on a free surface of at least one of said foam concrete panels opposite a surface facing said mortar.

10. The building structure according to claim 2, wherein a surface finish or hard crust is formed on a free surface of at least one of said foam concrete panels opposite a surface facing said mortar.

11. The building structure according to claim 2, wherein a surface finish or hard crust is formed on a free surface of at least one of said foam concrete panels opposite a surface facing said mortar.

12. The building structure according to claim 5, wherein a surface finish or hard crust is formed on a free surface of at least one of said foam concrete panels opposite a surface facing said mortar.

13. The building structure according to claim 6, wherein a surface finish or hard crust is formed on a free surface of at least one of said foam concrete panels opposite a surface facing said mortar.

14. The building structure according to claim 7, wherein a surface finish or hard crust is formed on a free surface of at least one of said foam concrete panels opposite a surface facing said mortar.

15. The building structure according to claim 1, wherein the foam concrete panel is an exterior foam concrete panel provided with a hard crust.

16. The building structure according to claim 1, wherein the foam concrete panel is held in place by said fixing elements.

17. The building structure, according to claim 1, which is formed as a floor/ceiling structure, wherein the reinforcing frame structure contains at least one load bearing beam placed in the plane of a floor/ceiling wherein said foam concrete panel is fixed to the at least one beam from below, and mortar is applied in between and above the at least one load bearing beam.

18. The building structure, according to claim 1, wherein the unbound anhydrous cement to water ratio is 0.25-1.90 or 0.625-0.75.

19. The building structure according to claim 1, which is formed as a roof structure in a location where it is exposed to neither loading nor abrasion.

20. The building structure according to claim 1, which is formed to hold up a roof covering, wherein elements for repairing an outer shell of the roof are embedded in the mortar.

21. The building structure according to claim 20, wherein the elements include at least one lath, at least one wood-block or a combination thereof.

22. The building structure according to claim 1, which includes flooring placed over the protecting layer.

23. A building structure comprising:
a reinforcing frame structure having interspaces;
at least one layer of a prefabricated, hardened, foam concrete panel fixed to the reinforcing frame structure; and
grinded and pressed foamed concrete that has been allowed to mature in order to produce granules of 0.5-10 mm size;
said interspaces are at least partially filled with a mortar providing a first surface contacting the foam concrete panel and having the foamed concrete granules of 0.5-10 mm size, wherein 50-200 kg of unbound, anhydrous cement and 150-300 litters of water are added before application per 1 m$^3$ of the grinded and pressed foamed concrete;
a protecting layer spread over the mortar;
flooring placed over said protecting layer;
said foam concrete panel includes slits to enable leakage of any excess amount of water in said mortar;
wherein said foam concrete panel is fixed to the reinforcing frame structure by fixing elements placed into indentations formed in a surface of said foam concrete panel; and
wherein:
said building structure is formed as a roof structure in a location where it is exposed to neither loading nor abrasion;
said building structure is formed to hold up a roof covering, wherein elements for repairing an outer shell of the roof are embedded in the mortar; and
said elements include at least one lath, at least one wood-block or a combination thereof.

* * * * *